(Model.)

G. W. KEMPER.
Machine for Shrinking Tires.

No. 238,594.  Patented March 8, 1881.

Witnesses:
E. A. Mathis
J. H. Roscoe

Inventor:
G. W. Kemper

United States Patent Office.

GEORGE W. KEMPER, OF GOODLETTSVILLE, TENNESSEE.

MACHINE FOR SHRINKING TIRES.

SPECIFICATION forming part of Letters Patent No. 238,594, dated March 8, 1881.

Application filed October 6, 1880. (Model.)

*To all whom it may concern:*

Be it known that I, GEORGE W. KEMPER, a citizen of the United States, residing at Goodlettsville, in the county of Davidson and State of Tennessee, have invented a new and useful Tire-Shrinking Machine, of which the following is a specification.

My invention relates to a new and improved tire-shrinking machine, which is constructed and operates upon different principles from all other tire-shrinking machines heretofore in use, and which will greatly facilitate the shrinking of wagon-tires, enabling the operator to perform the work with ease, speed, and perfect accuracy.

Figure 1:
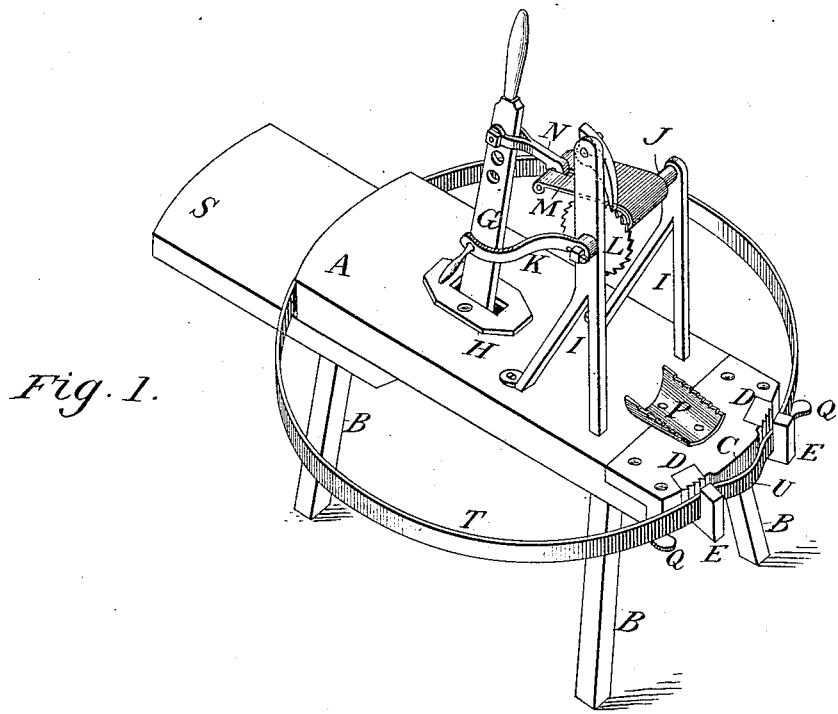
Figure 2:
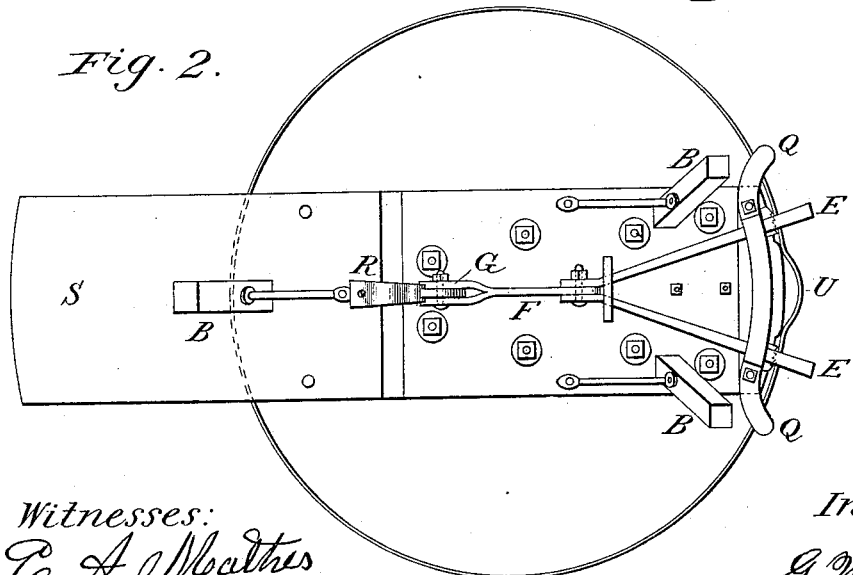

I attain these objects by the mechanism illustrated in the accompanying drawings, in which Figure 1 is a vertical view of the entire machine, and Fig. 2 is a bottom view, these two views being deemed sufficient to illustrate my machine.

The several parts are referred to by letters in each view.

The plate or table A and its legs B B B constitute the frame-work of the machine. The head C is made of cast-iron, with two niches in the front edge for the reception of two bearded steel dies, D D. The head C is made circular on the front edge in order to give the tire its original circle.

The jaws E E are made of wrought or malleable cast-iron, with long shanks extending backward horizontally under the table, as shown in Fig. 2, and are attached to a pitman, F, by means of a bolt passing through the shanks and pitman, as shown in the drawings. The other end of the pitman is attached to the lower end of the lever G by means of a bolt, as shown in the drawings. The said lever G has its fulcrum on an iron pin (unseen) which passes through the flanges of the escutcheon H and the said lever G. The said escutcheon has a flange on each side of the socket, that extend down to the bottom side of the table.

The brackets I I are made of wrought or malleable cast-iron, and are secured to the table by the vertical fork of the bracket passing through the table and a nut on the under side. The diagonal fork has a foot to it, through which a bolt passes to the bottom of the table. The said brackets I I are for the purpose of supporting the shaft J, to which is attached the crank K, the ratchet-wheel L, and the broad leather strap M, which is attached to the said shaft by means of screws passing through holes in one end of the strap and screwing into the shaft. The other end of the strap is connected to the lever G by means of the forked link N, as shown in the drawings.

The gage P is a trough-shaped piece of cast-iron with eight steps on each edge, one rising above the other, and is for the purpose of bending a short curve in the tire preparatory to shrinking it. The first step will cause it to shrink one-eighth of an inch; the second step will cause it to shrink two-eighths; the third will cause it to shrink three-eighths, and so on up to one inch. The gage is secured to the table by means of two bolts, as shown in the drawings.

The horns Q Q are the ends of a cross-bar, on which the jaws E E rest, and is secured to the head C by means of bolts. The said horns are for the purpose of supporting the tire and preventing it from bending edgewise while shrinking it.

The spring R, Fig. 2, is made fast to the tail-board S with a screw or bolt, while the other end works in a little notch in the lower end of the lever G, and is for the purpose of throwing the lever G backward at the upper end, which causes the jaws of the machine to open for the reception of the tire.

Mode of operating the machine: Six or seven inches of the tire T is heated red hot, and the tire is then placed in a vertical position crosswise on the gage P, resting on the steps that will shrink it the desired distance. A stroke or two with a hammer midway between the edges of the gage will drive the heated portion of the tire down until it touches the bottom of the gage, which forms a short sudden curve in the tire, as shown at U. The tire is then placed horizontally in the machine, resting on the shanks of the jaws E E and the horns Q Q and the tail-board S, with the heated portion of the tire midway between the jaws E E. The shaft J is turned by means of the crank K. The leather strap M winds around the shaft J as it revolves, bringing the lever G forward, which causes the jaws E E to close on the tire, pressing it against the bearded steel dies D D with an immense force, which prevents the tire from slipping while shrinking it. The short curve in the tire at U is now driven in with a hammer until it fits smoothly on the head C, which gives the tire its original circle. The work is then complete and ready to be placed back on the wheel.

I am aware that prior to my invention tire-shrinking machines have been in use. I therefore do not claim the discovery of shrinking a tire with a machine; but What I do claim as my invention, and desire to secure by Letters Patent, is—

1. The combination, in a tire-shrinking machine, of the several parts, as represented in the drawings, which is to gripe the tire between the jaws E E and the dies D D and hold it fast in two places, while the heated short curve at U is driven into the head C, which forces the metal together and causes it to occupy a shorter space than it did before, thereby diminishing the circumference of the tire, which will cause it to press tightly on the rim of the wheel.

2. The gage P, which enables the operator to perform the work with perfect accuracy without the trouble of measuring it, all substantially as set forth.

GEORGE WASHINGTON KEMPER.

Witnesses:
J. W. ROSCOE,
D. E. SCRUGGS.